US012614793B2

(12) United States Patent
Lim et al.

(10) Patent No.: US 12,614,793 B2
(45) Date of Patent: Apr. 28, 2026

(54) BATTERY CELL AND BATTERY CELL MANUFACTURING APPARATUS FOR MANUFACTURING THE SAME

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Hyung-Kyun Yu, Daejeon (KR);
Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 677 days.

(21) Appl. No.: 17/919,101

(22) PCT Filed: Mar. 8, 2022

(86) PCT No.: PCT/KR2022/003313
§ 371 (c)(1),
(2) Date: Oct. 14, 2022

(87) PCT Pub. No.: WO2022/191612
PCT Pub. Date: Sep. 15, 2022

(65) Prior Publication Data
US 2023/0170563 A1     Jun. 1, 2023

(30) Foreign Application Priority Data
Mar. 8, 2021     (KR) ........................ 10-2021-0030399

(51) Int. Cl.
*H01M 50/186*     (2021.01)
*H01M 10/04*     (2006.01)
(Continued)

(52) U.S. Cl.
CPC ..... *H01M 50/186* (2021.01); *H01M 10/0431* (2013.01); *H01M 50/119* (2021.01);
(Continued)

(58) Field of Classification Search
CPC ............. H01M 50/186; H01M 50/119; H01M 50/178; H01M 50/3425; H01M 50/394;
(Continued)

(56) References Cited

U.S. PATENT DOCUMENTS

2006/0238162 A1* 10/2006 Cheon ................. H01M 50/342
320/112
2009/0081542 A1* 3/2009 Yageta ..................... H01G 9/08
429/185
(Continued)

FOREIGN PATENT DOCUMENTS

CN     104137293 A     11/2014
CN     105684183 A     6/2016
(Continued)

OTHER PUBLICATIONS

International Search Report for Application No. PCT/KR2022/003313 mailed Jun. 13, 2022, pp. 1-3.
(Continued)

*Primary Examiner* — Adam J Francis
(74) *Attorney, Agent, or Firm* — Lerner David LLP

(57) ABSTRACT

Disclosed is a battery cell, which includes a battery case having an accommodation portion in which an electrode assembly is mounted, and a sealing portion formed by sealing an outer periphery thereof; an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein a non-adhesion portion is formed on an outer surface of the lead film, and the non-adhesion portion is configured to face an outer surface of the electrode lead.

18 Claims, 9 Drawing Sheets

100

110

8   8

300

300

400

400

115   210   250   115

200

(51) Int. Cl.
　　H01M 50/119　　(2021.01)
　　H01M 50/178　　(2021.01)
　　H01M 50/30　　(2021.01)
　　H01M 50/342　　(2021.01)
　　H01M 50/538　　(2021.01)

(52) U.S. Cl.
　　CPC ..... H01M 50/178 (2021.01); H01M 50/3425
　　(2021.01); H01M 50/394 (2021.01); H01M
　　50/538 (2021.01)

(58) Field of Classification Search
　　CPC ............. H01M 50/538; H01M 50/124; H01M
　　　　　　　50/105; H01M 50/188; H01M 50/342;
　　　　　　　H01M 50/552; H01M 50/553; H01M
　　　　　　　50/586; H01M 50/595; H01M 50/548;
　　　　　　　H01M 50/533; H01M 50/534; H01M
　　　　　　　10/0431
　　See application file for complete search history.

(56) References Cited

U.S. PATENT DOCUMENTS

| | | | | |
|---|---|---|---|---|
| 2014/0011060 | A1* | 1/2014 | Yang ..................... | H01M 50/55 |
| | | | | 29/623.2 |
| 2016/0315301 | A1* | 10/2016 | Kim .................. | H01M 50/3425 |
| 2018/0114964 | A1* | 4/2018 | Kim .................... | H01M 50/172 |

FOREIGN PATENT DOCUMENTS

| | | | | | | |
|---|---|---|---|---|---|---|
| JP | 200193489 | A | | 4/2001 | | |
| JP | 2006151752 | A | | 6/2006 | | |
| JP | 200795467 | A | | 4/2007 | | |
| JP | 201274363 | A | | 4/2012 | | |
| JP | 2015511060 | A | | 4/2015 | | |
| JP | 2017097984 | A | | 6/2017 | | |
| JP | 2018525804 | A | | 9/2018 | | |
| JP | 201991581 | A | | 6/2019 | | |
| KR | 100684724 | B1 | | 2/2007 | | |
| KR | 20080087192 | A | | 10/2008 | | |
| KR | 101370265 | B1 | | 3/2014 | | |
| KR | 20140129600 | A | * | 11/2014 | ......... | H01M 50/543 |
| KR | 101508547 | B1 | | 4/2015 | | |
| KR | 20150043900 | A | | 4/2015 | | |
| KR | 20160126157 | A | | 11/2016 | | |
| KR | 20160136540 | A | | 11/2016 | | |
| KR | 10-2018-0022651 | A | | 3/2018 | | |
| KR | 101987236 | B1 | | 6/2019 | | |

OTHER PUBLICATIONS

Search Report dated Nov. 11, 2024 from the Office Action for Chinese Application No. 202280003836.X issued Nov. 13, 2024, 2 pages.

* cited by examiner (b)

(a)

(b)

(a)

(b)

(a)

BATTERY CELL AND BATTERY CELL MANUFACTURING APPARATUS FOR MANUFACTURING THE SAME

CROSS-REFERENCE TO RELATED APPLICATIONS

The present application is a national phase entry under 35 U.S.C. § 371 of the International Application No. PCT/KR2022/003313 filed on Mar. 8, 2022, which claims priority from Korean Patent Application No. 10-2021-0030399 filed on Mar. 8, 2021, the disclosures of which are incorporated herein by reference in their entireties.

FIELD OF THE INVENTION

The present disclosure relates to a battery cell and a battery cell manufacturing apparatus for manufacturing the same, and more particularly, to a battery cell with improved external emission of gas generated inside the battery cell while securing easy manufacture, and a battery cell manufacturing apparatus for manufacturing the same.

BACKGROUND OF THE INVENTION

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which a battery assembly is included in a cylindrical or prismatic metal can, and a pouch-type battery in which the battery assembly is included in a pouch-type case of an aluminum laminate sheet. Here, the battery assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type battery assembly is included in a pouch-type battery case made of an aluminum laminate sheet is being used more and more due to low manufacturing cost, small weight, and easy modification.

FIG. 1 is a top view showing a conventional battery cell. FIG. 2 is a cross-sectional view, taken along the axis 2-2 of FIG. 1. Referring to FIGS. 1 and 2, a conventional battery cell 10 includes a battery case 20 having an accommodation portion 21 in which a battery assembly 11 is mounted, and a sealing portion 25 formed by sealing an outer periphery thereof. Here, the battery cell 10 includes an electrode lead 30 protruding out of the battery case 20 via the sealing portion 25, and a lead film 40 is located between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting may occur in the battery cell due to gas generation. In addition, moisture may penetrate into the battery cell damaged by the venting, which may cause side reactions, and there is a problem that battery performance deteriorates and additional gas is generated. Accordingly, there is an increasing need to develop a battery cell with improved external emission of gas generated inside the battery cell.

BRIEF SUMMARY OF THE INVENTION

The present disclosure is directed to providing a battery cell with improved external emission of gas generated inside the battery cell while securing easy manufacture, and a battery cell manufacturing apparatus for manufacturing the same.

The object to be solved by the present disclosure is not limited to the above-mentioned object, and the objects not mentioned here may be clearly understood by those skilled in the art from this specification and the accompanying drawings.

In one aspect of the present disclosure, there is provided a battery cell, comprising: a battery case having an accommodation portion in which an electrode assembly is mounted, and a sealing portion formed by sealing an outer periphery thereof; an electrode lead electrically connected to an electrode tab included in the electrode assembly and protruding out of the battery case via the sealing portion; and a lead film located at a portion corresponding to the sealing portion in at least one of an upper portion and a lower portion of the electrode lead, wherein a non-adhesion portion is formed on an outer surface of the lead film, and the non-adhesion portion is configured to face an outer surface of the electrode lead.

The non-adhesion portion may extend along a protruding direction of the electrode lead.

Based on the protruding direction of the electrode lead, one end of the non-adhesion portion may be located inner than an inner surface of the sealing portion, and the other end of the non-adhesion portion may be located outer than an outer surface of the sealing portion.

An area of one end of the non-adhesion portion located inner than the inner surface of the sealing portion may be greater than an area of the other end of the non-adhesion portion located outer than the outer surface of the sealing portion.

The non-adhesion portion may have a circular shape or a rectangular shape.

The non-adhesion portion may include a first non-adhesion portion and a second non-adhesion portion connected to each other, the first non-adhesion portion may be configured to extend along a longitudinal direction of the non-adhesion portion, and the second non-adhesion portion may be configured to extend along a protruding direction of the electrode lead.

A length of the first non-adhesion portion may be smaller than a width of the electrode lead, and a length of the second non-adhesion portion may be smaller than a width of the lead film.

The lead film may include a first lead film and a second lead film, the first lead film may be located at an upper portion of the electrode lead, and the second lead film may be located at a lower portion of the electrode lead.

3

The electrode lead may be located between the first lead film and the second lead film, and the first lead film and the second lead film may be integrated with each other.

The non-adhesion portion may be formed in at least one of the first lead film and the second lead film.

A surface-deformed portion may be formed on the outer surface of the electrode lead, and at least a part of the surface-deformed portion may be configured to face the non-adhesion portion.

The surface-deformed portion may be formed by removing a part of the outer surface of the electrode lead.

The surface-deformed portion may be configured to extend along a protruding direction of the electrode lead.

Based on the protruding direction of the electrode lead, one end of the surface-deformed portion may be located inner than an inner surface of the sealing portion, and the other end of the surface-deformed portion may be located outer than an outer surface of the sealing portion.

An area of one end of the surface-deformed portion located inner than the inner surface of the sealing portion may be greater than an area of the other end of the surface-deformed portion located outer than the outer surface of the sealing portion.

The surface-deformed portion and the non-adhesion portion may have the same shape.

A coating layer may be formed on the outer surface of the electrode lead, and the surface-deformed portion may be formed by removing a part of the coating layer.

The coating layer may be made of a metal material.

The metal material may contain at least one of chrome and nickel.

The lead film may have gas permeability of 20 Barrer to 60 Barrer at 60° C.

The lead film may have a moisture penetration amount of 0.02 g to 0.2 g for 10 years at 25° C., 50% RH.

The lead film may contain polypropylene.

The lead film at the non-adhesion portion may have a thickness of 100 μm to 300 μm.

A width between the other end of the non-adhesion portion and an outermost end of the lead film may be 2 mm or more.

In another aspect of the present disclosure, there is also provided a battery cell manufacturing apparatus for manufacturing the battery cell described above, comprising: a jig configured to press the electrode lead and the lead film together, wherein the jig includes a concave portion formed on one surface thereof facing the lead film, the jig presses the lead film so that the non-adhesion portion is formed at the other surface of the lead film, which is opposite to one surface of the lead film facing the concave portion, and the non-adhesion portion is formed with the same shape as the concave portion.

The concave portion may be formed by etching one surface of the jig.

A surface-deformed portion may be formed at the outer surface of the electrode lead, and at least a part of the surface-deformed portion may be formed at a location facing the concave portion.

The surface-deformed portion may have the same shape as the concave portion.

According to the embodiments, the present disclosure provides a battery cell, which includes a lead film having a non-adhesion portion, and a battery cell manufacturing apparatus for manufacturing the same, thereby improving the external emission of gas generated inside the battery cell while securing easy manufacture.

The effect of the present disclosure is not limited to the above effects, and the effects not mentioned here will be clearly understood by those skilled in the art from this specification and the accompanying drawings.

DETAILED DESCRIPTION

Figure 1:
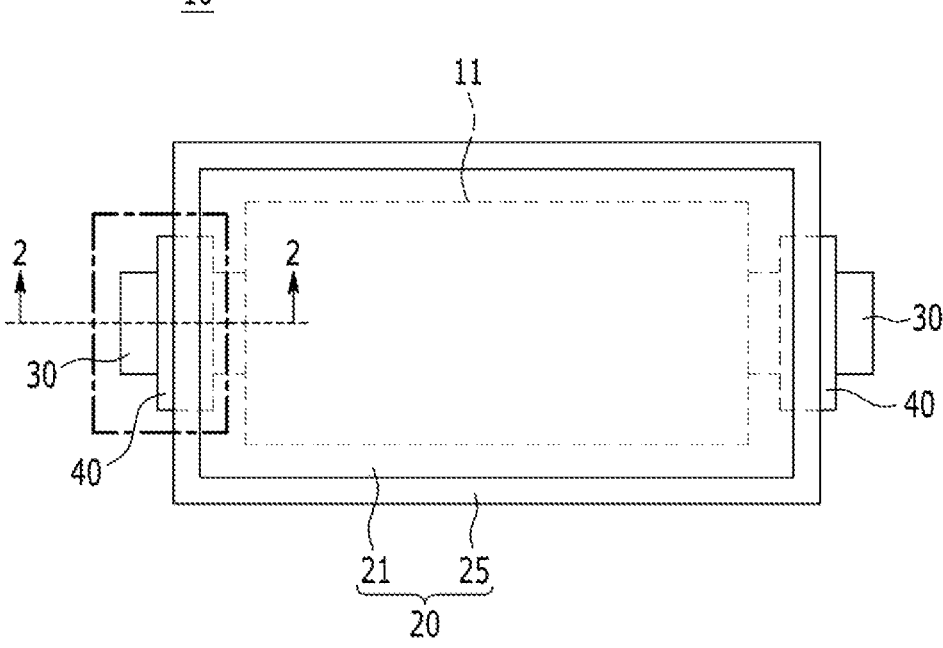
FIG. 1 is a top view showing a conventional battery cell.
Figure 2:
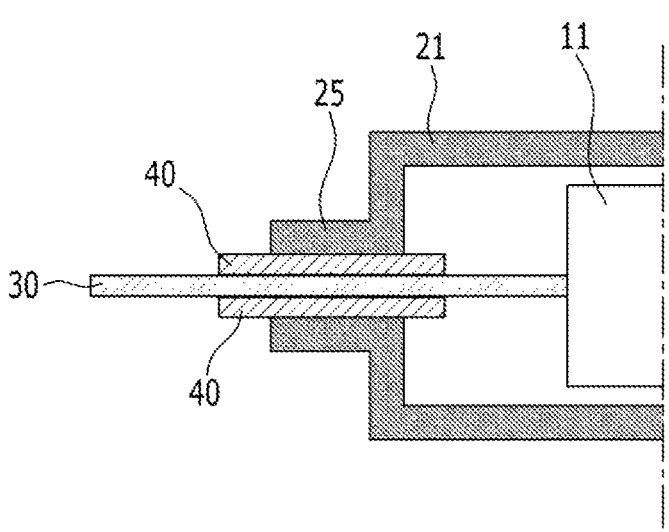
FIG. 2 is a cross-sectional view, taken along the axis 2-2 of FIG. 1.

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described. However, here, the description will be made based on one side surface of both side surfaces of the pouch battery cell 100, but it is not necessarily limited thereto, and the same or similar contents may be described in the case of the other side surface.

Figure 3:
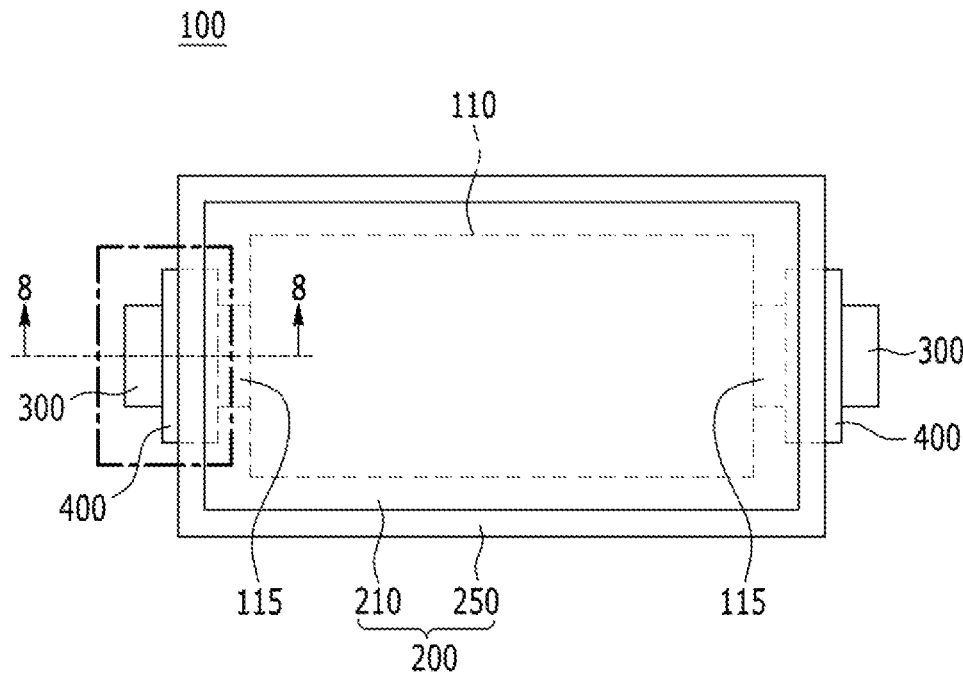
FIG. 3 is a top view showing a battery cell according to an embodiment of the present disclosure.

FIG. 3 is a top view showing a battery cell according to an embodiment of the present disclosure.

Referring to FIG. 3, the battery cell 100 according to this embodiment includes a battery case 200, an electrode lead 300, and a lead film 400.

The battery case 200 includes an accommodation portion 210 in which an electrode assembly 110 is mounted, and a sealing portion 250 formed by sealing an outer periphery thereof. The sealing portion 250 may be sealed by heat, laser, or the like. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

Also, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

Hereinafter, the electrode lead 300 and the lead film 400 will be mainly described.

Figure 4:
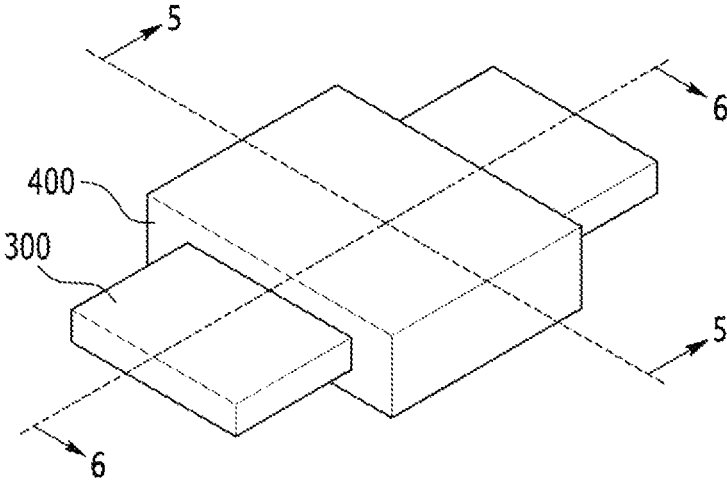
FIG. 4 is a perspective view showing an electrode lead included in the battery cell of FIG. 3.

FIG. 4 is a perspective view showing an electrode lead included in the battery cell of FIG. 3.

Referring to FIGS. 3 and 4, the electrode lead 300 is electrically connected to an electrode tab (not shown) included in the electrode assembly 110, and protrudes out of the battery case 200 via the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during thermal fusion.

FIG. 5 is a cross-sectional view, taken along the axis 5-5 of FIG. 4. FIG. 6 is a cross-sectional view, taken along the axis 6-6 of FIG. 4.

Referring to FIGS. 5 and 6, in this embodiment, a non-adhesion portion 450 is formed on the outer surface of the lead film 400, and the non-adhesion portion 450 may face the outer surface of the electrode lead 300. More specifically, in the lead film 400, a non-adhesion portion 450 may be formed on one surface of the lead film 400 in contact with the electrode lead 300.

Here, the non-adhesion portion 450 may be formed during a sealing process in which the lead film 400 and the electrode lead 300 are fused to each other. More specifically, the non-adhesion portion 450 may be a portion in which the lead film 400 and the electrode lead 300 come into contact with each other and a relatively small amount of heat and/or pressure is applied to the lead film 400. That is, in the lead film 400, the non-adhesion portion 450 is a portion having relatively weak adhesion to the electrode lead 300, and may be a non-adhesion region between the electrode lead 300 and the lead film 400. In other words, the non-adhesion portion 450 is a non-adhesion region between the lead film 400 and the electrode lead 300, which may serve as a gas discharge passage through which gas may flow.

However, in FIGS. 5 and 6, the thickness of the non-adhesion portion 450 is somewhat exaggerated, and in reality, the non-adhesion portion 450 may not have an appearance deformation of the lead film 400, when viewed with the naked eye.

For example, the non-adhesion portion 450 may be a portion in which the electrode lead 300 and the lead film 400 are in contact with each other but are not adhered to each other. As another example, the non-adhesion portion 450 may have a thickness of 0.01 μm to several hundred μm. However, the thickness of the non-adhesion portion 450 is not limited thereto, and the non-adhesion portion 450 may have a thickness capable of weakening the adhesive force so as not to damage airtightness and durability between the electrode lead 300 and the lead film 400.

More specifically, the pressure inside the battery cell 100 is higher than the pressure inside the non-adhesion portion 450, and the resulting pressure difference may act as a driving force for the gas. At this time, the gas generated inside the battery cell 100 may be introduced into the non-adhesion portion 450 due to the above-described pressure difference. Also, since the inside of the non-adhesion portion 450 may have a pressure difference from the outside due to the gas introduced from the inside of the battery cell 100, the gas introduced into the non-adhesion portion 450 may be discharged to the outside.

Accordingly, in the battery cell 100 according to this embodiment, the gas generated inside the battery case 200 may be discharged to the non-adhesion portion 450 according to the pressure difference with the inside of the non-adhesion portion 450, and the gas introduced into the non-adhesion portion 450 may be discharged to the outside according to the pressure difference with the outside.

Moreover, according to an embodiment of the present disclosure, the degree of gas discharge in the pouch and the airtightness and durability of the pouch may be adjusted according to the thickness, location, shape, or the like of the non-adhesion portion 450.

For example, referring to FIGS. 5 and 6, the lead film 400 may include a first lead film and a second lead film respectively positioned at an upper portion and a lower portion of the electrode lead 300. In addition, the first lead film and the second lead film may be integrated with each other. For example, the first lead film and the second lead film may be fused and integrated with each other by heat, laser, or the like. Accordingly, the lead film 400 may improve the sealing property of the sealing portion 250 and the electrode lead 300, while preventing the side surface of the electrode lead 300 from being exposed to the outside.

Figure 5B:
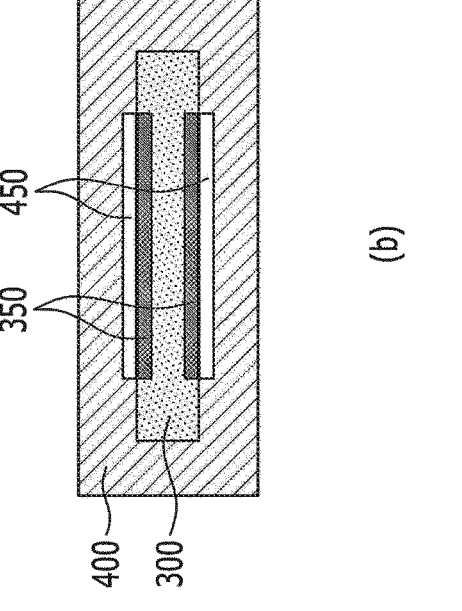
FIG. 5 is a cross-sectional view, taken along the axis 5-5 of FIG. 4.
Figure 5B:
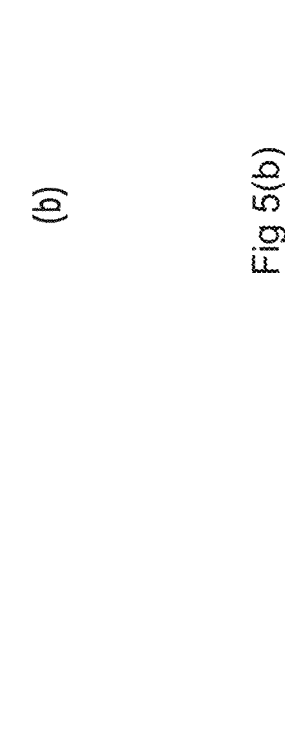
Figure 5A:
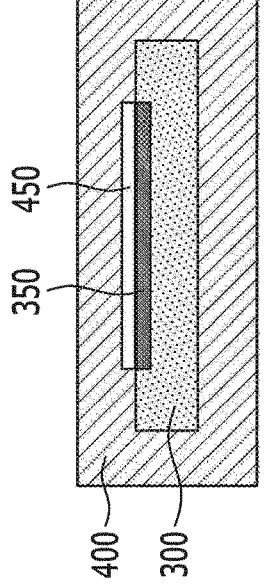
Figure 5A:
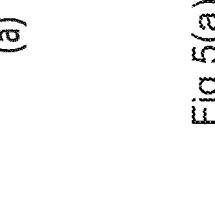
Figures 6A, 6B:
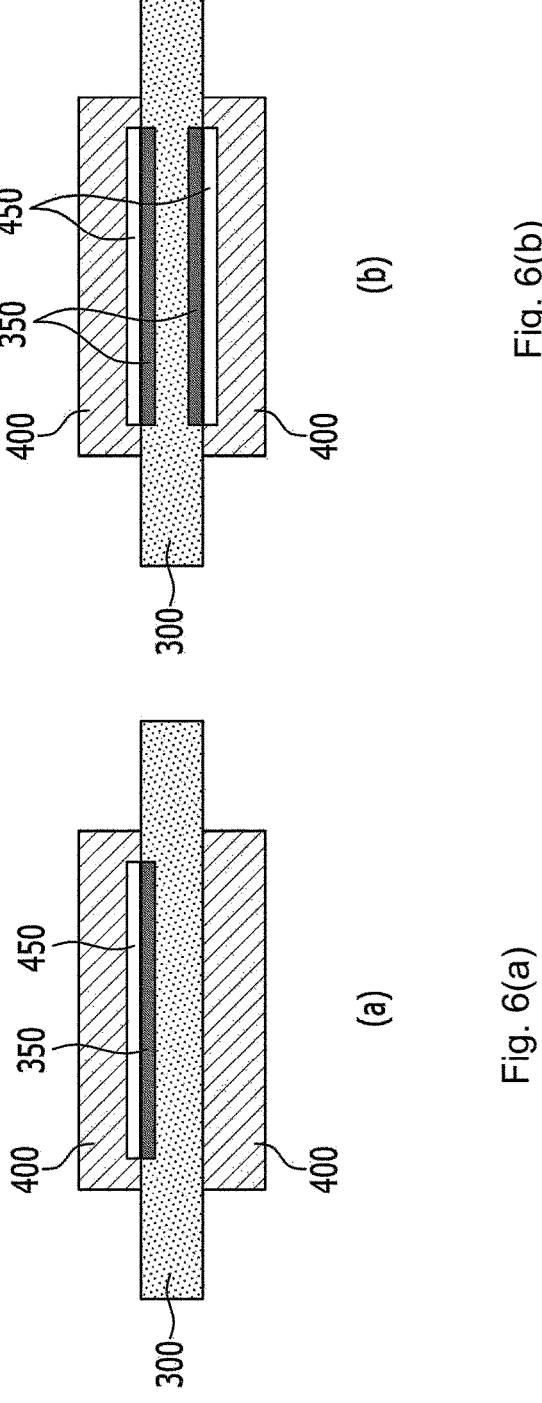
FIG. 6 is a cross-sectional view, taken along the axis 6-6 of FIG. 4.

In addition, in the lead film 400, as shown in FIGS. 5(a) and 6(a), the non-adhesion portion 450 may be located in at least one of the first lead film and the second lead film. In addition, as shown in FIGS. 5(b) and 6(b), the non-adhesion portion 450 may be located in the first lead film and the second lead film, respectively.

However, the number of the non-adhesion portion 450 is not limited to the above, and the non-adhesion portion 450 may be formed in an appropriate number for the lead film 400.

Accordingly, durability and airtightness between the electrode lead 300 and the lead film 400 may be controlled by adjusting the number of the non-adhesion portions 450 formed on the lead film 400. In addition, if necessary, by minimizing the number of the non-adhesion portion 450, it is possible to simplify the manufacturing process and reduce the cost.

Referring to FIGS. 5 and 6, the battery cell 100 according to another embodiment of the present disclosure may further include a surface-deformed portion 350 formed on the outer surface of the electrode lead 300. Here, at least a part of the surface-deformed portion 350 may face the non-adhesion portion 450. That is, in the electrode lead 300, the surface-deformed portion 350 may be formed to have an area equal to or larger than the surface of the non-adhesion portion 450 facing the electrode lead 300.

Accordingly, in the process of forming the non-adhesion portion 450 by a battery cell manufacturing apparatus 1000 (FIG. 9), explained later, a portion of the electrode lead 300 where the surface-deformed portion 350 is formed is not in contact with the non-adhesion portion 450, so it is possible to prevent a part of the lead film 400 from being pushed into the non-adhesion portion 450. Moreover, together with the non-adhesion portion 450, the surface-deformed portion 350 may act as a gas discharge passage in the battery case 200, and thus the efficiency of internal gas discharge may be further increased. More specifically, in the electrode lead 300, the surface-deformed portion 350 is formed on the outer surface of the electrode lead 300, and the surface-deformed portion 350 is located between the lead film 400 and the electrode lead 300. More specifically, in the electrode lead 300, the surface-deformed portion 350 may be formed at a position corresponding to the non-adhesion portion 450.

The surface-deformed portion 350 may be formed by removing a part of the outer surface of the electrode lead 300. However, in FIGS. 5 and 6, the thickness of the surface-deformed portion 350 is somewhat exaggerated, and in fact, the surface-deformed portion 350 may be formed to such a thickness that deformation is substantially not viewed with the naked eye in the appearance of the electrode lead 300.

For example, the surface-deformed portion 350 may have a thickness of 0.01 μm to several hundred on. However, the thickness of the surface-deformed portion 350 is not limited thereto, and any thickness is applicable as long as it can prevent the lead film 400 from being pushed without damaging the airtightness and durability between the electrode lead 300 and the lead film 400.

Accordingly, during the sealing process in which the sealing portion 250, the electrode lead 300, the lead film 400, and the like are fused, the electrode lead 300 and the lead film 400 are adhered to each other, but since the electrode lead 300 and the lead film 400 are partially spaced apart from each other by the surface-deformed portion 350, it may serve as a gas discharge passage through which the gas may flow together with the non-adhesion portion 450 of the lead film 400.

More specifically, the internal pressure of the battery cell 100 is higher than the internal pressure of the space formed in the surface-deformed portion 350 and the non-adhesion portion 450, and the resulting pressure difference may act as a driving force for the gas. At this time, the gas generated inside the battery cell 100 may be introduced into the space formed in the surface-deformed portion 350 and the non-adhesion portion 450 by the above-described pressure difference. In addition, the pressure in the space formed in the surface-deformed portion 350 and the non-adhesion portion 450 may be different from the external pressure due to the gas introduced from the inside of the battery cell 100, so the gas introduced into the space formed in the surface-deformed portion 350 and the non-adhesion portion 450 may be discharged to the outside.

Moreover, according to an embodiment of the present disclosure, as the phenomenon that the non-adhesion portion 450 is pushed inward is controlled by the thickness, position, shape, or the like of the surface-deformed portion 350, the position, size, and the like of the non-adhesion portion 450 may be adjusted. In addition, according to the space formed in the surface-deformed portion 350 and the non-adhesion portion 450, the degree of gas discharge in the pouch and the airtightness and durability of the pouch may be adjusted.

For example, a coating layer (not shown) may be formed on the outer surface of the electrode lead 300. Here, the coating layer (not shown) may be a layer formed by coating the outer surface of the electrode lead 300. Here, the surface-deformed portion 350 may be formed by removing a part of the coating layer (not shown).

More specifically, the surface-deformed portion 350 may be formed by etching the surface of the coating layer (not shown) or the electrode lead 300 by laser, UV-ozone (UvO) treatment, sputtering, or the like. However, the etching method is not limited thereto, and any process capable of forming a predetermined shape by processing the surface of the electrode lead 300 may be applied. Here, the coating layer (not shown) is not depicted in the drawings for convenience of description, and the outer surfaces of the electrode lead 300 located at both sides of the surface-deformed portion 350 may be described as the coating layer (not shown).

For example, the coating layer (not shown) may be made of a metal material. More specifically, the metal material may contain at least one of chrome and nickel. However, the coating layer (not shown) is not limited thereto, and may include a material generally coated on the outer surface of the electrode lead 300.

Accordingly, since the surface-deformed portion 350 may be formed by removing the coating layer (not shown) formed on the outer surface of the electrode lead 300, there is an advantage in that the surface-deformed portion 350 may be prepared through a relatively simple manufacturing process without requiring additional components. In addition, if the surface-deformed portion 350 is formed by removing the coating layer (not shown) formed on the outer surface of the electrode lead 300, when the surface-deformed portion 350 is actually viewed with the naked eye, it is possible to minimize the deformation of the appearance of the electrode lead 300.

As another example, the surface-deformed portion 350 may be formed by removing a part of the outer surface of the electrode lead 300. For example, the surface-deformed portion 350 may be formed by removing a part itself corresponding to the outer surface of the electrode lead 300. That is, the outer surface of the electrode lead 300 may have a stepped structure due to the surface-deformed portion 350.

More specifically, the surface-deformed portion 350 may be formed by etching the outer surface of the electrode lead 300 by laser, UV-ozone (UvO) treatment, sputtering, or the like. However, the etching method for the surface-deformed portion 350 is not limited thereto, and any process capable of forming a predetermined shape by processing the surface of the electrode lead 300 may be applied.

Accordingly, since the surface-deformed portion 350 may be formed by removing the outer surface of the electrode lead 300, so the surface-deformed portion 350 may be prepared through a relatively simple manufacturing process, and there is an advantage in that no additional parts are required.

For example, the surface-deformed portion 350 may be located on at least one of the upper surface of the electrode lead 300 or the lower surface of the electrode lead 300, based on the surface of the lead film 400 on which the non-adhesion portion 450 is positioned. As shown in FIGS. 5(*a*) and 6(*a*), when the non-adhesion portion 450 is positioned on the first lead film, the surface-deformed portion 350 may be positioned on the upper surface of the electrode lead 300. Conversely, when the non-adhesion portion 450 is positioned on the second lead film, the surface-deformed portion 350 may be positioned on the lower surface of the electrode lead 300. In addition, as shown in FIGS. 5(*b*) and 6(*b*), when the non-adhesion portion 450 is positioned on the first lead film and the second lead film, respectively, the surface-deformed portion 350 may be located on the upper and lower surfaces of the electrode lead 300, respectively. However, the number of the surface-deformed portion 350 is not limited to the above, and the surface-deformed portion may be formed in an appropriate number on the outer surface of the electrode lead 300.

Accordingly, since the number and position of the surface-deformed portion 350 may be adjusted to correspond to the non-adhesion portion 450, it is possible to prevent the lead film 400 from being pushed at the non-adhesion portion 450. In addition, the surface-deformed portion 350 may act as a gas discharge passage together with the non-adhesion portion 450 to effectively increase the amount of gas discharged from the inside of the battery cell 100.

Figures 7A, 7B, 7C:
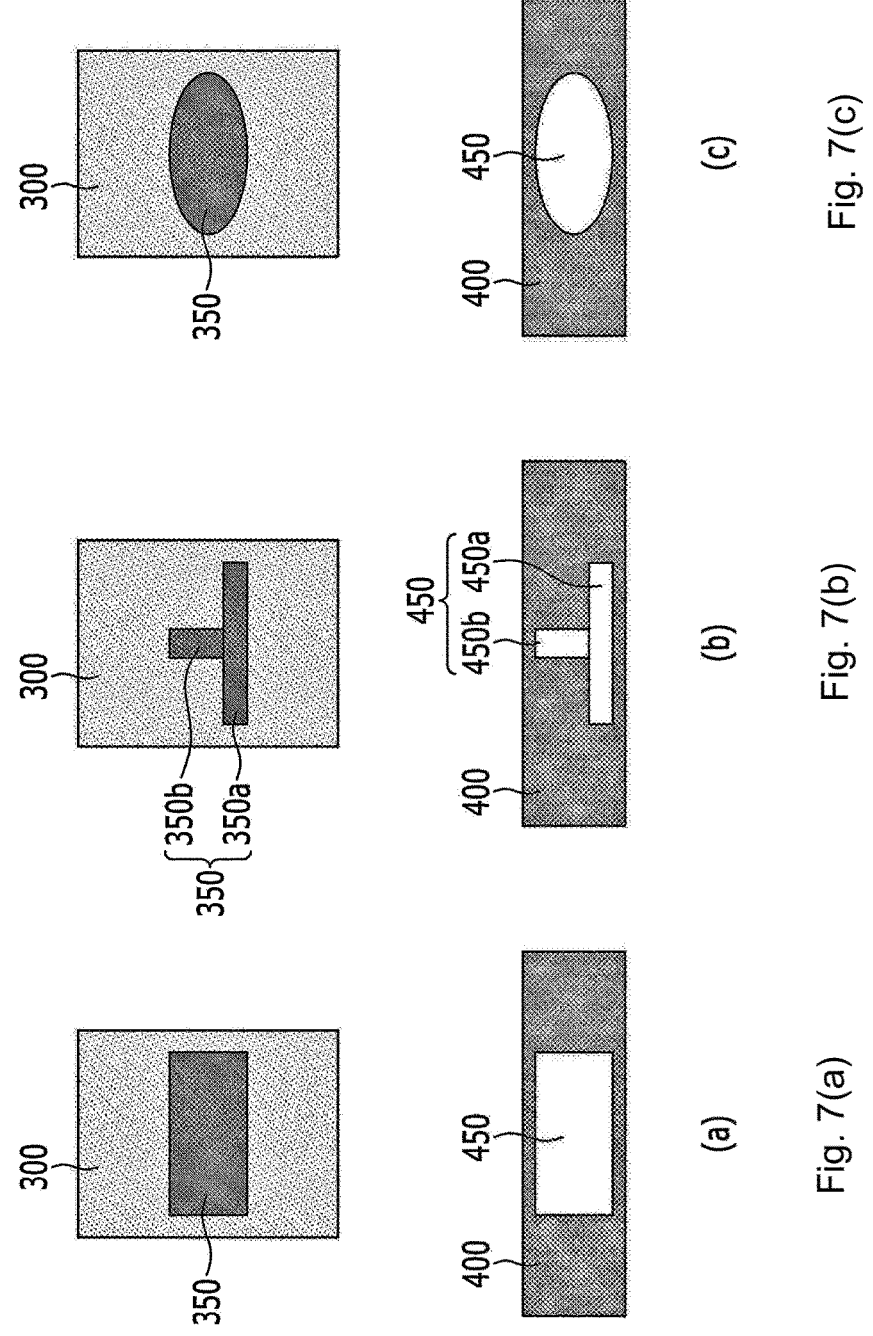
FIG. 7 is an enlarged view showing the electrode lead and a lead film in the battery cell of FIG. 3, respectively.

FIG. 7 is an enlarged view showing the electrode lead and the lead film in the battery cell of FIG. 3, respectively.

Referring to FIGS. 5 to 7, the non-adhesion portion 450 extends along the protruding direction of the electrode lead 300. In other words, based on the protruding direction of the electrode lead 300, the end of the non-adhesion portion 450 located adjacent to the outer side of the sealing portion 250 may be located inner than the end of the lead film 400.

Also, the width of the non-adhesion portion 450 may be smaller than the width of the lead film 400. In this specification, the width of the non-adhesion portion 450 refers to a maximum value of the distance between one end and the other end of the non-adhesion portion 450 based on the protruding direction of the electrode lead 300, and the width of the lead film 400 refers to a maximum value of the distance between one end and the other end of the lead film 400 based on the protruding direction of the electrode lead 300. Also, the non-adhesion portion 450 may be positioned between one end and the other end of the lead film 400 based on the protruding direction of the electrode lead 300.

In addition, the non-adhesion portion 450 extends in a direction perpendicular to the protruding direction of the electrode lead 300, and the length of the non-adhesion portion 450 may be smaller than the width of the electrode lead 300. In this specification, the length of the non-adhesion portion 450 refers to a maximum value of the distance between one end and the other end of the non-adhesion portion 450 based on a direction perpendicular to the protruding direction of the electrode lead 300, and the width of the electrode lead 300 refers to a maximum value of the distance between one end and the other end of the electrode lead 300 based on a direction perpendicular to the protruding direction of the electrode lead 300.

For example, referring to FIGS. 7(*a*) and 7(*c*), the non-adhesion portion 450 may have a circular shape or a rectangular shape. As another example, referring to FIG. 7(*b*), the non-adhesion portion 450 includes a first non-adhesion portion 450*a* and a second non-adhesion portion 450*b* connected to each other. The first non-adhesion portion 450*a* may extend along the longitudinal direction of the sealing portion 250, and the second non-adhesion portion 450*b* may extend along the protruding direction of the electrode lead 300. In this specification, the longitudinal direction of the sealing portion 250 refers to a direction perpendicular to the protruding direction of the electrode lead 300.

Here, the length of the first non-adhesion portion 450*a* may be smaller than the width of the electrode lead 300, and the length of the second non-adhesion portion 450*b* may be smaller than the width of the lead film 400. In this specification, the length of the first non-adhesion portion 450*a* refers to a maximum value of the distance between one end and the other end of the first non-adhesion portion 450*a* based on a direction perpendicular to the protruding direction of the electrode lead 300, the length of the second non-adhesion portion 450*b* refers to a maximum value of the distance between one end and the other end of the second non-adhesion portion 450*b* based on the protruding direction of the electrode lead 300.

However, the shape of the non-adhesion portion 450 is not limited to the above, and the non-adhesion portion 450 may be formed in an appropriate shape on the outer surface of the lead film 400.

Accordingly, by adjusting the shape of the non-adhesion portion 450 formed on the outer surface of the lead film 400, the durability and airtightness between the electrode lead 300 and the lead film 400 may be controlled. In addition, by changing the shape of the non-adhesion portion 450 as necessary, it is possible to simplify the manufacturing process and reduce the cost.

Referring to FIGS. 5 to 7, in another embodiment of the present disclosure, the battery cell 100 may further include a surface-deformed portion 350 formed on the outer surface of the electrode lead 300. Here, the surface-deformed portion 350 extends along the protruding direction of the electrode lead 300, based on the protruding direction of the electrode lead 300, and the end of the surface-deformed portion 350 adjacent to the outer side of the sealing portion 250 may be located inner than the end of the lead film 400. In this specification, the outer side of the sealing portion 250 means the end of the sealing portion 250 adjacent to the outside of the battery case 200. In addition, the inner side inner than the end of the lead film 400 means an inner side of the battery case 200 inner than the end of the lead film 400 adjacent to the outside of the battery case 200.

More specifically, the width of the surface-deformed portion 350 may be smaller than the width of the lead film 400. In this specification, the width of the surface-deformed portion 350 refers to a maximum value of the distance between one end and the other end of the surface-deformed portion 350 based on the protruding direction of the electrode lead 300. Also, the surface-deformed portion 350 may be positioned between one end and the other end of the lead film 400 based on the protruding direction of the electrode lead 300.

In addition, the surface-deformed portion 350 extends in a direction perpendicular to the protruding direction of the electrode lead 300, and the length of the surface-deformed portion 350 may be smaller than the width of the electrode lead 300. In this specification, the length of the surface-deformed portion 350 refers to a maximum value of the distance between one end and the other end of the surface-deformed portion 350 based on a direction perpendicular to the protruding direction of the electrode lead 300.

Here, the surface-deformed portion 350 may have a shape identical or similar to that of the non-adhesion portion 450.

For example, referring to FIGS. 7(*a*) and 7(*c*), the surface-deformed portion 350 may have a circular shape or a rectangular shape, like the non-adhesion portion 450. As another example, referring to FIG. 7(*b*), the surface-deformed portion 350 includes a first surface-deformed portion 350*a* and a second surface-deformed portion 350*b* connected to each other. The first surface-deformed portion 350a may extend along the longitudinal direction of the sealing portion, and the second surface-deformed portion 350b may extend along the protruding direction of the electrode lead. Here, the shape of the first surface-deformed portion 350a may correspond to the shape of the first non-adhesion portion 450a, and the shape of the second surface-deformed portion 350b may correspond to the shape of the second non-adhesion portion 450b.

For example, the width of the first surface-deformed portion 350a may be greater than or equal to the width of the first non-adhesion portion 450a, and the width of the second surface-deformed portion 350b may be greater than or equal to the width of the second non-adhesion portion 450b. In this specification, the width of the first surface-deformed portion 350a refers to a maximum value of the distance between one end and the other end of the first surface-deformed portion 350a based on the protruding direction of the electrode lead 300, and the width of the first non-adhesion portion 450a refers to a maximum value of the distance between one end and the other end of the first non-adhesion portion 450a based on the protruding direction of the electrode lead 300. The width of the second surface-deformed portion 350b refers to a maximum value of the distance between one end and the other end of the second surface-deformed portion 350b based on a direction perpendicular to the protruding direction of the electrode lead 300, and the width of the second non-adhesion portion 450b refers to a maximum value of the distance between one end and the other end of the second non-adhesion portion 450b based on a direction perpendicular to the protruding direction of the electrode lead 300.

However, the shape of the surface-deformed portion 350 is not limited to the above, and the surface-deformed portion 350 may be appropriately formed in a shape corresponding to the non-adhesion portion 450.

Accordingly, since the shape of the surface-deformed portion 350 may be adjusted to correspond to the non-adhesion portion 450, it is possible to prevent the lead film 400 from being pushed at the non-adhesion portion 450 and to effectively increase the amount of gas discharged from the inside of the battery cell 100.

Figure 8:
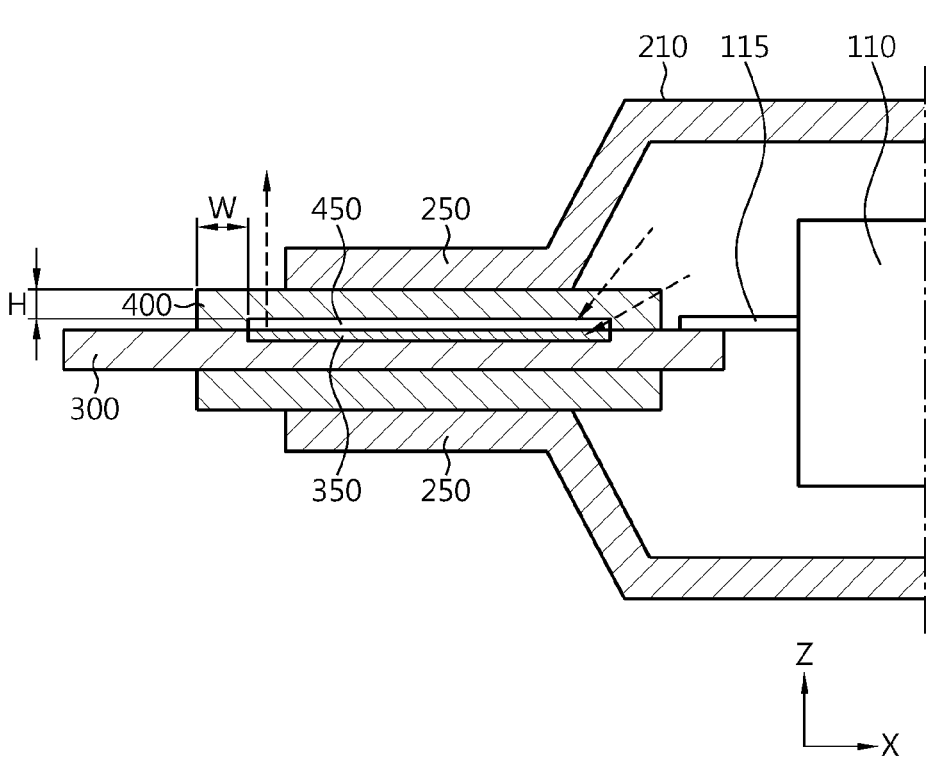
FIG. 8 is a cross-sectional view, taken along the axis 8-8 of FIG. 3.

FIG. 8 is a cross-sectional view, taken along the axis 8-8 of FIG. 3.

Referring to FIG. 8, in one embodiment of the present disclosure, based on the protruding direction of the electrode lead 300, one end of the non-adhesion portion 450 may be located inner than the inner surface of the sealing portion 250, and the other end of the non-adhesion portion 450 may be located outer than the outer surface of the sealing portion 250. In this specification, the inner surface of the sealing portion 250 means an end of the sealing portion 250 adjacent to the inside of the battery case 200, and one end of the non-adhesion portion 450 located inner than the inner surface of the sealing portion 250 means that one end of the non-adhesion portion 450 is located in the inner direction of the battery case 200 rather than the inner surface of the sealing portion 250. If one end of the non-adhesion portion 450 is located inner than the inner surface of the sealing portion 250, the non-adhesion portion 450 is not interfered by the sealing portion 250, so that gas may be more easily introduced into the non-adhesion portion 450. In addition, the outer surface of the sealing portion 250 means an end of the sealing portion 250 adjacent to the outside of the battery case 200, and the other end of the non-adhesion portion 450 located outer than the outer surface of the sealing portion 250 means that the other end of the non-adhesion portion 450 is located in the outer direction of the battery case 200 rather than the outer surface of the sealing portion 250. If the other end of the non-adhesion portion 450 is located outer than the outer surface of the sealing portion 250, the gas introduced into the non-adhesion portion 450 may be more easily discharged to the outside. For example, since the other end of the non-adhesion portion 450 is not interfered by the sealing portion 250, the gas introduced into the non-adhesion portion 450 may be more easily discharged to the outside.

Accordingly, the gas generated inside the battery cell 100 may be discharged toward the non-adhesion portion 450, and the gas introduced into the non-adhesion portion 450 may be easily discharged toward the outside. In addition, the amount of gas generated inside the battery cell 100 and discharged to the outside may also be increased.

In addition, in another embodiment of the present disclosure, the battery cell 100 may further include a surface-deformed portion 350 formed on the outer surface of the electrode lead 300. Here, based on the protruding direction of the electrode lead 300, one end of the surface-deformed portion 350 may be located inner than the inner surface of the sealing portion 250, and based on the protruding direction of the electrode lead 300, the other end of the surface-deformed portion 350 may be located outer than the outer surface of the sealing portion 250. If one end of the surface-deformed portion 350 is located inner than the inner surface of the sealing portion 250, the surface-deformed portion 350 is not interfered by the sealing portion 250, so that gas may be more easily introduced into the surface-deformed portion 350. If the other end of the surface-deformed portion 350 is located outer than the outer surface of the sealing portion 250, the gas introduced into the surface-deformed portion 350 may be more easily discharged to the outside. For example, since the other end of the surface-deformed portion 350 is not interfered by the sealing portion 250, the gas introduced into the surface-deformed portion 350 may be more easily discharged to the outside.

Accordingly, the gas generated inside the battery cell 100 may be discharged toward the surface-deformed portion 350 and/or the non-adhesion portion 450, and the gas introduced into the surface-deformed portion 350 and/or the non-adhesion portion 450 may be easily discharged toward the outside. In addition, the amount of gas generated inside the battery cell 100 and discharged to the outside may also be increased.

Moreover, since both ends of the surface-deformed portion 350 and/or the non-adhesion portion 450 are exposed to the inside of the battery case 200 and the outside of the battery case 200, the gas generated inside the battery case 200 may be easily introduced into the surface-deformed portion 350 and/or the non-adhesion portion 450 and may also be more easily discharged to the outside of the surface-deformed portion 350 and/or the non-adhesion portion 450.

Specifically, the gas introduced into the surface-deformed portion 350 and/or the non-adhesion portion 450 may be discharged along the Z-axis direction through the lead film 400 on the surface-deformed portion 350 and/or the non-adhesion portion 450. For example, if the other end of the surface-deformed portion 350 and/or the non-adhesion portion 450 is located outer than the outer surface of the sealing portion 250, the gas introduced into the surface-deformed portion 350 and/or the non-adhesion portion 450 may be discharged along the Z-axis direction at the portion of the lead film 400 between the other end of the surface-deformed portion 350 and/or the non-adhesion portion 450 and the outer surface of the sealing portion 250.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the battery cell may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

The moisture penetration amount of the lead film 400 may be measured by adopting the ASTM F 1249 method. At this time, the moisture penetration amount may be measured using equipment officially certified by MCOON.

In one embodiment of the present disclosure, the lead film 400 may have a gas permeability of 20 Barrer to 60 Barrer at 60° C. and a moisture penetration amount of 0.02 g to 0.2 g at 25° C., 50% RH for 10 years. If the gas permeability and the moisture penetration amount of the lead film 400 satisfy the above ranges, the penetration of moisture from the outside may be more effectively prevented while discharging the gas generated inside the secondary battery.

In one embodiment of the present disclosure, the lead film 400 may include a polyolefin-based resin. For example, the lead film 400 may include a polyolefin-based resin satisfying the gas permeability and/or moisture penetration amount values described above. The polyolefin-based resin may include at least one material selected from the group consisting of polypropylene, polyethylene, and polyvinyl difluoride (PVDF). While the lead film 400 contains polypropylene, the gas permeability of the lead film 400 may be 20 Barrer to 60 Barrer at 60° C. Also, the moisture penetration amount may be 0.06 g to 0.15 g. In this case, the gas generated inside the secondary battery may be more effectively discharged, and the penetration of moisture from the outside may be easily prevented.

In addition, since the lead film 400 is made of the above-described material, the lead film 400 may maintain the airtightness of the battery cell 100 and prevent leakage of the internal electrolytic solution.

Referring to FIG. 8, the thickness (H) of the lead film 400 at the non-adhesion portion 450 may be 100 μm to 300 μm, or 100 μm to 200 μm. If the thickness (H) of the lead film 400 at the non-adhesion portion 450 satisfies the above range, the gas inside the battery case 200 may be more easily discharged to the outside.

Referring to FIG. 8, the width (W) between the other end of the surface-deformed portion 350 and/or the non-adhesion portion 450 and the outermost end of the lead film 400 may be 2 mm or more, or 2 mm to 3 mm. If the width (W) between the other end of the surface-deformed portion 350 and/or the non-adhesion portion 450 and the outermost end of the lead film 400 satisfies the above range, it may be easier to prevent the lead film 400 from being torn during the process of discharging the gas generated inside the battery case 200 to the outside.

In one embodiment of the present disclosure, if one end of the surface-deformed portion 350 and/or the non-adhesion portion 450 is located inner than the inner surface of the sealing portion 250 and the other end of the surface-deformed portion 350 and/or the non-adhesion portion 450 is located outer than the outer surface of the sealing portion 250, the area of the other end of the surface-deformed portion 350 and/or the non-adhesion portion 450 exposed outer than the outer surface of the sealing portion 250 may be greater than the area of one end of the surface-deformed portion 350 and/or the non-adhesion portion 450 exposed inner than the inner surface of the sealing portion 250. The gas discharge amount is proportional to the gas discharge area and pressure. Since the pressure on the inner side of the battery case 200 is greater than the pressure on the outer side of the battery case 200, if the area of the other end of the surface-deformed portion 350 and/or the non-adhesion portion 450 exposed outer than the outer surface of the sealing portion 250 is greater than the area of one end of the surface-deformed portion 350 and/or the non-adhesion portion 450 exposed inner than the inner surface of the sealing portion 250, the gas generated inside the battery case 200 may be more easily discharged to the outside.

In one embodiment of the present disclosure, the area of the other end of the surface-deformed portion 350 and/or the non-adhesion portion 450 exposed at the outer side of the sealing portion 250 may be 40 mm² to 80 mm². This is a size in which about 0.5 cc to 3 cc of gas can be discharged per day based on an internal pressure of 1 atm at 60° C. In addition, this is a size in which the moisture penetration amount may be 0.02 g to 0.2 g for 10 years at 25° C., 50% RH.

FIG. 9 is a diagram for illustrating the process of bonding the electrode lead and the lead film by a battery cell manufacturing apparatus according to another embodiment of the present disclosure. FIGS. 10(a) and (b) are cross-sectional views, taken along the axes 10a-10a and 10b-10b of FIG. 9, respectively.

Referring to FIGS. 9 and 10, the battery cell manufacturing apparatus according to another embodiment of the present disclosure is an apparatus for manufacturing the battery cell 100, and includes a jig 1000 for pressing the electrode lead 300 and the lead film 400 together. Accordingly, the electrode lead 300 and the lead film 400 may be adhered to each other by heat and/or pressure applied by the jig 1000.

Figures 9A, 9B:
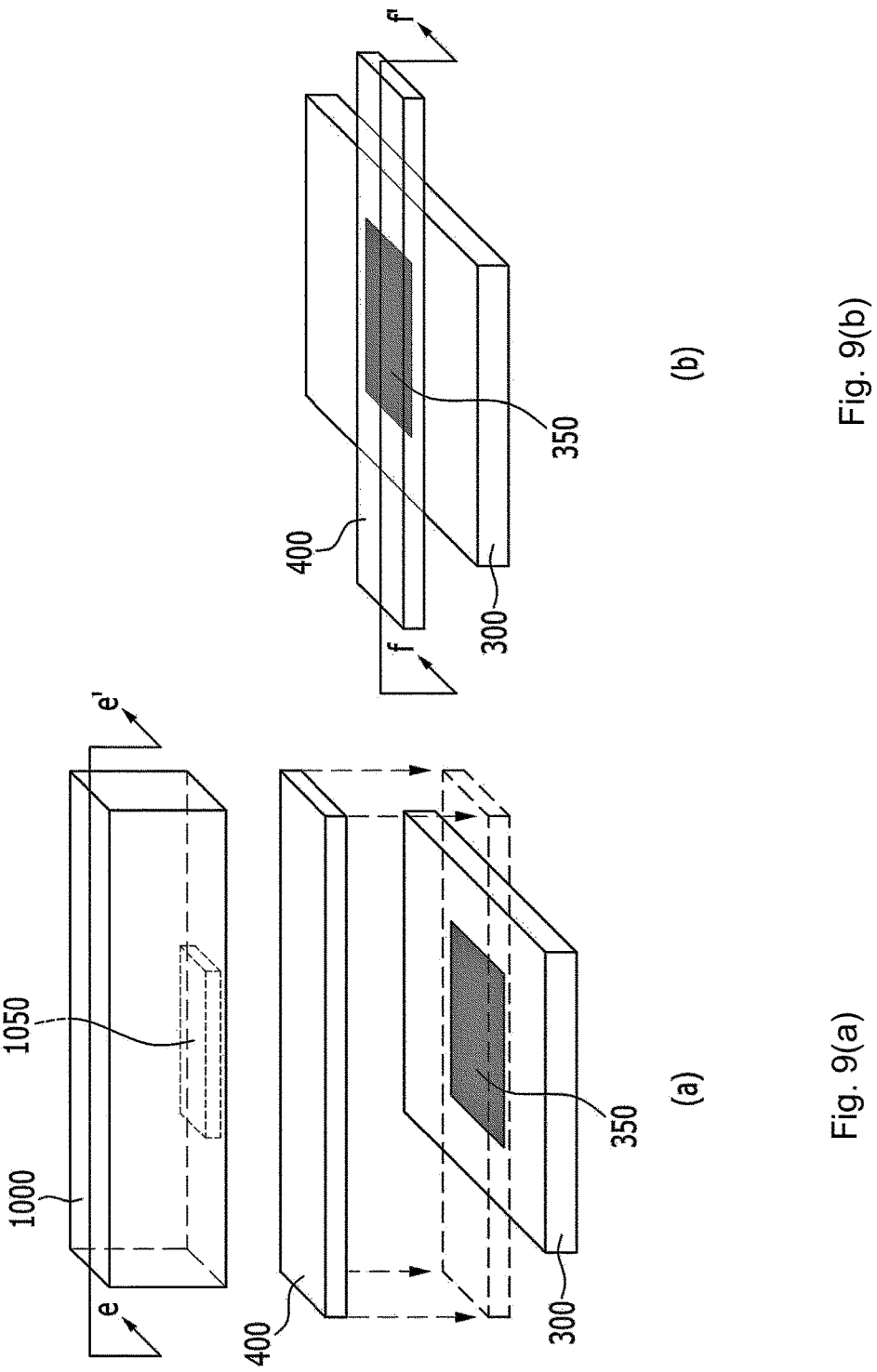
FIG. 9 is a diagram for illustrating the process of adhering the electrode lead and the lead film by a battery cell manufacturing apparatus according to another embodiment of the present disclosure.
Figure 10B:
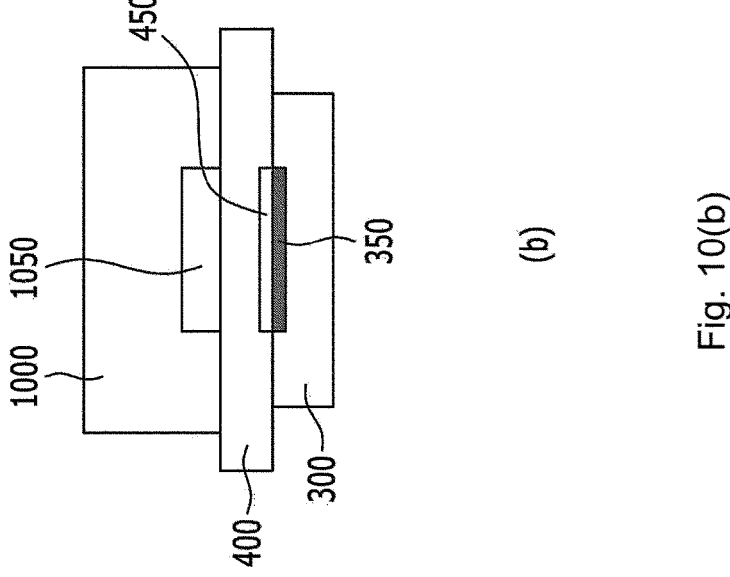
FIG. 10 is a cross-sectional view, taken along the axes e-e' and f-f' of FIG. 9, respectively.
Figure 10A:
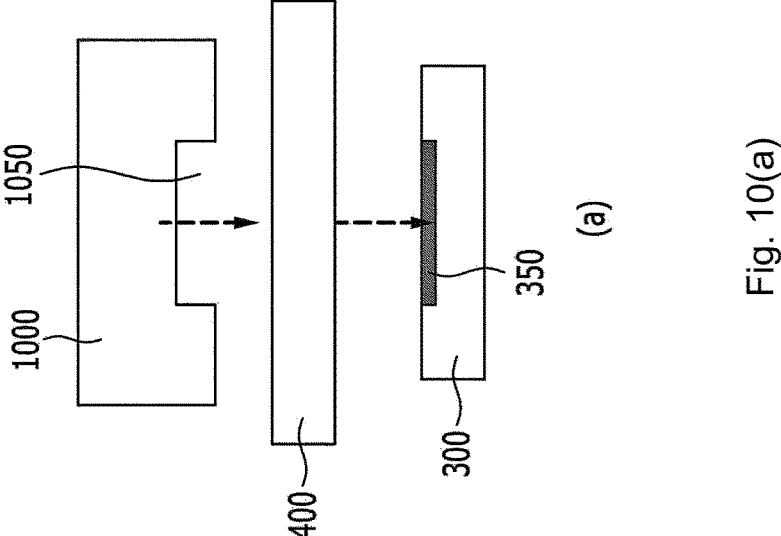

More specifically, referring to FIGS. 9(a) and 10(a), the jig 1000 includes a concave portion 1050 on one surface facing the lead film 400. Here, the concave portion 1050 may be formed by etching one surface of the jig 1000.

For example, the concave portion 1050 may be formed by etching the outer surface of the jig 1000 by laser, UV-ozone (UvO) treatment, sputtering, or the like. However, the etching method is not limited thereto, and any process capable of forming a predetermined shape by processing the surface of the jig 1000 may be applied.

Referring to FIGS. 9(b) and 10(b), the jig 1000 presses the lead film 400 so that a non-adhesion portion 450 is formed at the other surface of the lead film 400, which is opposite to one surface of the lead film 400 facing the concave portion 1050. Here, the non-adhesion portion 450 may be formed in a shape identical or similar to that of the concave portion 1050.

In addition, referring to FIGS. 9 and 10, in another embodiment of the present disclosure, if the surface-deformed portion 350 is formed on the outer surface of the electrode lead 300, at least a part of the surface-deformed portion 350 may be formed at a location facing the concave portion 1050. For example, the surface-deformed portion 350 may have a shape identical or similar to that of the concave portion 1050. In other words, the surface-deformed portion 350 may have a shape identical or similar to that of the non-adhesion portion 450 formed by the concave portion 1050.

Accordingly, even if the jig 1000 presses the electrode lead 300 and the lead film 400, the outer surface of the lead film 400 facing the surface-deformed portion 350 does not come into contact with the electrode lead 300 by the surface-deformed portion 350, and thus the non-adhesion portion 450 may be easily formed. In addition, in this case, it is possible to prevent the lead film 400 from being pushed at the non-adhesion portion 450.

Figure 11B:
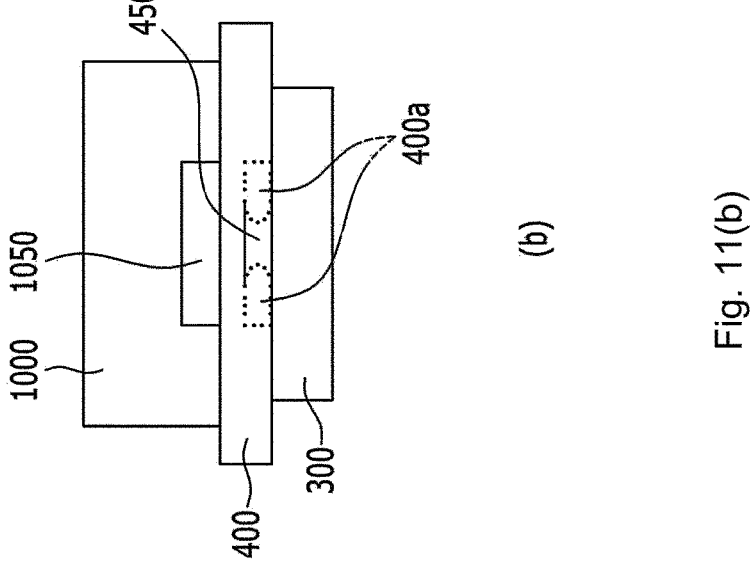
FIG. 11 is a cross-sectional view substantially identical to that of FIG. 10, in which a surface-deformed portion is not formed in the electrode lead.
Figure 11A:
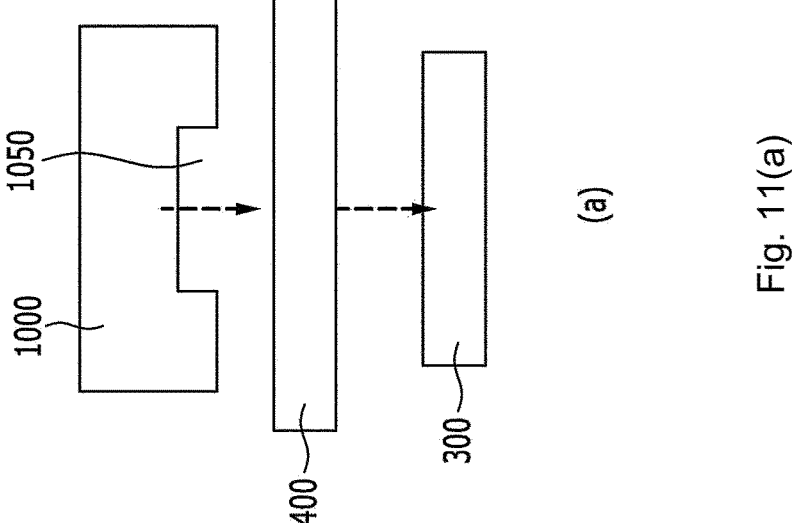

FIGS. 11(*a*) and (*b*) are cross-sectional views substantially identical to those of FIGS. 10(*a*) and (*b*), respectively, in which a surface-deformed portion is not formed in the electrode lead.

Referring to FIG. 11, in one embodiment of the present disclosure, even when the surface-deformed portion 350 is not formed on the outer surface of the electrode lead 300, since the heat and/or pressure applied to the outer surface of the lead film 400 corresponding to the concave portion 1050 is relatively low, the non-adhesion portion 450 may be formed on the other surface of the lead film 400, which is opposite to one surface of the lead film 400 facing the concave portion 1050.

Accordingly, the non-adhesion portion 450 may be formed on the lead film 400 in the process of fusing the sealing portion 250, the electrode lead 300 and the lead film 400 without a separate additional process for the lead film 400. That is, according to this embodiment, the manufacturing process is simple, and the amount of gas discharged from the inside of the battery cell 100 may be effectively increased.

However, since the electrode lead 300 and the lead film 400 are in contact with each other, a part of the lead film 400 may be pushed into the non-adhesion portion 450 while the jig 1000 presses the electrode lead 300 and the lead film 400. Here, referring to FIG. 11(*b*), a protrusion 400*a* may be formed in the non-adhesion portion 450 since a part of the lead film 400 is pushed.

Accordingly, in order to prevent the lead film 400 on which the protrusion 400*a* is formed in the non-adhesion portion 450 from being pushed and to more effectively increase the amount of gas discharged from the inside of the battery cell 100, it may be more preferable that the surface-deformed portion 350 is formed on the outer surface of the electrode lead 300 as shown in FIG. 10.

A battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and present disclosure may be applied various devices that can use a battery module and a battery pack including the same, which is also within the scope of the right of the present disclosure.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

What is claimed is:

1. A battery cell, comprising:
   a battery case having an accommodation portion in which an electrode assembly is mounted, and a sealing portion formed by sealing an outer periphery thereof;
   an electrode lead electrically connected to an electrode tab included in the electrode assembly and protruding out of the battery case via the sealing portion; and
   a lead film located at a portion corresponding to the sealing portion in at least one of an upper portion and a lower portion of the electrode lead,
   wherein a non-adhesion portion is formed on an outer surface of the lead film without penetrating the lead film, and the non-adhesion portion is configured to face and contact an outer surface of the electrode lead to define a non-adhesion region between the electrode lead and the lead film such that a gas generated inside the battery case is configured to be introduced into the non-adhesion region and to be discharged outside the battery case through the non-adhesion region between the lead film and the electrode lead.

2. The battery cell according to claim 1,
   wherein the non-adhesion portion extends along a protruding direction of the electrode lead.

3. The battery cell according to claim 2,
   wherein based on the protruding direction of the electrode lead, one end of the non-adhesion portion is located inner than an inner surface of the sealing portion, and the other end of the non-adhesion portion is located outer than an outer surface of the sealing portion.

4. The battery cell according to claim 3,
   wherein an area of one end of the non-adhesion portion located inner than the inner surface of the sealing portion is greater than an area of other end of the non-adhesion portion located outer than the outer surface of the sealing portion.

5. The battery cell according to claim 1,
   wherein the non-adhesion portion includes a first non-adhesion portion and a second non-adhesion portion connected to each other,
   the first non-adhesion portion is configured to extend along a longitudinal direction of the non-adhesion portion, and
   the second non-adhesion portion is configured to extend along a protruding direction of the electrode lead.

6. The battery cell according to claim 1,
   wherein the lead film includes a first lead film and a second lead film, the first lead film is located at an upper portion of the electrode lead, and the second lead film is located at a lower portion of the electrode lead.

7. The battery cell according to claim 6,
   wherein the electrode lead is located between the first lead film and the second lead film, and the first lead film and the second lead film are integrated with each other.

8. The battery cell according to claim 6,
   wherein the non-adhesion portion is formed in at least one of the first lead film and the second lead film.

9. The battery cell according to claim 1,
   wherein a surface-deformed portion is formed on the outer surface of the electrode lead, and at least a part of the surface-deformed portion is configured to face the non-adhesion portion.

10. The battery cell according to claim 9, wherein the surface-deformed portion is formed by removal of a part of the outer surface of the electrode lead.

11. The battery cell according to claim 9, wherein the surface-deformed portion is configured to extend along a protruding direction of the electrode lead.

12. The battery cell according to claim 11, wherein based on the protruding direction of the electrode lead, one end of the surface-deformed portion is located inner than an inner surface of the sealing portion, and the other end of the surface-deformed portion is located outer than an outer surface of the sealing portion.

13. The battery cell according to claim 12, wherein an area of one end of the surface-deformed portion located inner than the inner surface of the sealing portion is greater than an area of other end of the surface-deformed portion located outer than the outer surface of the sealing portion.

14. The battery cell according to claim 9, wherein the surface-deformed portion and the non-adhesion portion have the same shape.

15. The battery cell according to claim 10, wherein a coating layer is formed on the outer surface of the electrode lead, and the surface-deformed portion is formed by removal of a part of the coating layer.

16. The battery cell according to claim 15, wherein the coating layer is made of a metal material.

17. The battery cell according to claim 1, wherein the lead film has gas permeability of 20 Barrer to 60 Barrer at 60° C.

18. The battery cell according to claim 1, wherein the lead film has a moisture penetration amount of 0.02 g to 0.2 g for 10 years at 25° C., 50% RH.

\* \* \* \* \*